UNITED STATES PATENT OFFICE.

TURNER D. BOTTOME, OF NEWARK, NEW JERSEY, ASSIGNOR TO JOHN B. TIBBITS, OF HOOSICK, NEW YORK.

MANUFACTURE OF INCANDESCENT-LAMP FILAMENTS.

SPECIFICATION forming part of Letters Patent No. 401,120, dated April 9, 1889.

Application filed September 29, 1887. Serial No. 251,057. (No specimens.)

*To all whom it may concern:*

Be it known that I, TURNER D. BOTTOME, a citizen of the United States, and a resident of Newark, in the county of Essex and State of New Jersey, have invented certain new and useful Improvements in the Manufacture of Incandescents for Electric Lamps, of which the following is a specification.

This invention relates to an improved method of manufacturing filaments for incandescent electric lamps and to the improved filament produced thereby.

The invention also relates to the treatment of the carbonized filament for the purpose of hardening and strengthening it; and it consists in the various steps and manipulation and in the product, substantially as hereinafter more fully described and claimed.

To carry my invention into effect, I may take any of the usual forms of carbon, such as are derived from baking various forms of vegetable fiber, among which linen thread, tampico, or cocoa fiber are examples. After these fibers have been carbonized by baking I dip or soak them in a saturated solution of tungsten trioxide dissolved in aqua-ammonia or in any of the fixed alkalies. The filaments thus prepared are dried and then subjected to a high heat by incandescing them electrically in the presence of dry hydrogen gas, or the fibers may be saturated with a tungsten compound before baking or carbonizing and then placed in a crucible packed with carbon dust and heated to whiteness. In both instances the result is to reduce tungsten compounds to tungsten metal. The addition of tungsten to the carbon appears to produce in the filament a property similar to that conferred on steel by the addition of tungsten—namely, a great increase in hardness and strength. Obviously the soaking, drying, and subsequent reduction of tungsten compounds to the metal may be repeated several times until sufficient quantity of tungsten has been incorporated with the carbon.

I do not confine myself to any particular period in the process for impregnating the fibers or filaments with a tungsten solution, nor to the particular compound of tungsten herein described, as others may be found available.

I claim as my invention—

1. The process of manufacturing filaments, consisting in saturating a carbon filament with a tungsten compound and reducing such compound to metal tungsten, substantially as herein described.

2. An incandescent filament composed of metallic tungsten and carbon in varying proportions, for the purpose as herein described.

Signed this 15th day of August, A. D. 1887.

TURNER D. BOTTOME.

Witnesses:
T. J. McTIGHE,
PHILIP FRANK.